(12) United States Patent
Hu et al.

(10) Patent No.: US 10,260,751 B2
(45) Date of Patent: Apr. 16, 2019

(54) SINGLE SKIN COMBUSTOR WITH HEAT TRANSFER ENHANCEMENT

(71) Applicant: Pratt & Whitney Canada Corp., Longueuil (CA)

(72) Inventors: Tin-Cheung John Hu, Markham (CA); Si-Man Amy Lao, Toronto (CA); Sri Sreekanth, Mississauga (CA); Michael Papple, Verdun (CA)

(73) Assignee: PRATT & WHITNEY CANADA CORP., Longueuil, QC (CA)

( * ) Notice: Subject to any disclaimer, the term of this patent is extended or adjusted under 35 U.S.C. 154(b) by 290 days.

(21) Appl. No.: 14/867,377

(22) Filed: Sep. 28, 2015

(65) Prior Publication Data
US 2017/0089580 A1    Mar. 30, 2017

(51) Int. Cl.
F23R 3/06    (2006.01)
F23R 3/04    (2006.01)
F23R 3/00    (2006.01)

(52) U.S. Cl.
CPC ............... *F23R 3/04* (2013.01); *F23R 3/002* (2013.01); *F23R 3/005* (2013.01); *F23R 3/06* (2013.01); *F23R 2900/03042* (2013.01); *F23R 2900/03045* (2013.01)

(58) Field of Classification Search
CPC .. F23R 3/04; F23R 3/002; F23R 3/005; F23R 3/06; F23R 2900/03041; F23R 2900/03042; F23R 2900/03043; F23R 2900/03045
See application file for complete search history.

(56) References Cited

U.S. PATENT DOCUMENTS

| | | | |
|---|---|---|---|
| 3,623,711 A | 11/1971 | Thorstenson | |
| 5,233,828 A * | 8/1993 | Napoli ................. | F02K 1/822 60/755 |
| 5,279,127 A * | 1/1994 | Napoli ................. | F02K 1/822 60/754 |
| 5,329,773 A * | 7/1994 | Myers ................. | F23R 3/002 60/757 |

(Continued)

FOREIGN PATENT DOCUMENTS

| | | |
|---|---|---|
| DE | 102013221286 A1 | 4/2015 |
| EP | 0972992 A2 | 1/2000 |

(Continued)

OTHER PUBLICATIONS

European Search Report dated May 3, 2017 in related EP application No. EP16191236.

(Continued)

*Primary Examiner* — Steven Sutherland
(74) *Attorney, Agent, or Firm* — Norton Rose Fulbright Canada LLP

(57) ABSTRACT

A combustor for a gas turbine engine comprises a single skin liner defining a combustion chamber. The single skin liner has an inner surface facing the combustion chamber and an outer surface exposed to a coolant flow discharged in a plenum extending from the outer surface of the single skin liner to the engine casing. Cooling holes extend through the single skin liner. Cooling protuberances, such as fins or pin fins, project integrally from the outer surface of the single skin liner into the plenum, the cooling fins being interspersed between the cooling holes.

15 Claims, 3 Drawing Sheets

(56) References Cited

U.S. PATENT DOCUMENTS

| | | | |
|---|---|---|---|
| 6,134,877 | A | 10/2000 | Alkabie |
| 6,546,730 | B2 | 4/2003 | Johnson et al. |
| 6,681,578 | B1 | 1/2004 | Bunker |
| 7,451,600 | B2 | 11/2008 | Patel et al. |
| 8,024,933 | B2 | 9/2011 | Woolford et al. |
| 8,220,273 | B2 | 7/2012 | Iwasaki |
| 8,453,460 | B2 | 6/2013 | Dugar et al. |
| 8,955,330 | B2 | 2/2015 | Narcus et al. |
| 2006/0196188 | A1* | 9/2006 | Burd .................. F23R 3/002 60/754 |
| 2010/0011775 | A1 | 1/2010 | Garry et al. |
| 2010/0186416 | A1* | 7/2010 | Chen .................... F23R 3/06 60/755 |
| 2012/0047908 | A1 | 3/2012 | Poyyapakkam et al. |
| 2012/0304654 | A1 | 12/2012 | Melton et al. |
| 2013/0180252 | A1 | 7/2013 | Chen |
| 2014/0020393 | A1 | 1/2014 | Nakamata et al. |
| 2014/0238031 | A1 | 8/2014 | Okita et al. |
| 2015/0121885 | A1 | 5/2015 | Yokota et al. |

FOREIGN PATENT DOCUMENTS

| | | |
|---|---|---|
| EP | 27133106 A1 | 4/2014 |
| JP | 2000320837 A | 11/2000 |
| WO | WO2014/200588 A2 | 12/2014 |

OTHER PUBLICATIONS

European Search Report dated Jan. 26, 2017 in corresponding EP application No. EP16191216.

* cited by examiner

SINGLE SKIN COMBUSTOR WITH HEAT TRANSFER ENHANCEMENT

TECHNICAL FIELD

The application relates generally to gas turbine engines and, more particularly, to single skin combustor liner cooling.

BACKGROUND OF THE ART

Compared to double or multi-skinned combustors, a single skin design has the potential to be lighter in weight and hence lower in cost. However, current effusion cooled liner designs are limited in efficiency due to manufacturing constraints such as hole size and angle. Therefore, without increasing cooling air consumption, additional heat removal is a challenge. In aviation gas turbine engines, it is desirable that the amount of air supplied for cooling combustor walls be minimized in order not to negatively affect the overall performances of the engine. This poses challenges to meeting the durability requirements of single skin combustor walls, because the reduction in combustion wall cooling air may lead to unwanted material oxidation, thermal mechanical fatigue and/or thermal wall buckling due to thermal gradients. Particularly in small aero gas turbine engines, the total amount of air available for combustor wall cooling within the gas turbine thermodynamic cycle can be limited, especially where rich-burn combustion is sought. Therefore, it is a challenge to optimize the combustor wall cooling while still meeting the durability requirements of single skin combustors.

SUMMARY

In one aspect, there is provided a single skin combustor for a gas turbine engine having an engine casing, the single skin combustor comprising: a single skin liner defining a combustion chamber, the single skin liner having an inner surface exposed to the combustion chamber and an outer surface exposed to air in a plenum circumscribed by the engine casing, the outer surface of the single skin liner being an outermost surface of the combustor, cooling holes extending through the single skin liner, and cooling protrusions projecting integrally from the outer surface of the single skin liner, the cooling protrusions being interspersed between the cooling holes.

In another aspect, there is provided a method of cooling a single skin liner of a combustor of a gas turbine engine having an engine casing defining a plenum around the single skin liner, the method comprising: 1) providing a first usage of cooling air in the plenum by causing the cooling air to flow through cooling protuberances extending from an outer surface of the single skin liner, the cooling protuberances projecting into the plenum, 2) providing a second usage of the cooling air by flowing the cooling air through cooling holes defined in the single skin liner, the cooling holes fluidly linking a combustion chamber of the combustor to the plenum, and 3) providing a third usage of the cooling air by using the cooling air exiting the cooling holes to form a film of cooling air over an inner surface of the single skin liner.

In a still further aspect, there is provided a gas turbine engine comprising a gas generator case, a combustor disposed within the gas generator case, the combustor comprising a single skin liner circumscribing a combustion chamber, the single skin liner and the gas generator case defining therebetween a plenum, the single skin liner having an outer surface exposed to cooling air in the plenum and an inner surface exposed to combustion gases in the combustion chamber, cooling holes defined in the single skin liner, the cooling holes fluidly liking the plenum to the combustion chamber, and cooling protuberances integrally projecting from the outer surface of the single skin liner into the plenum.

DESCRIPTION OF THE DRAWINGS

Reference is now made to the accompanying figures in which.

DETAILED DESCRIPTION

Figure 1:
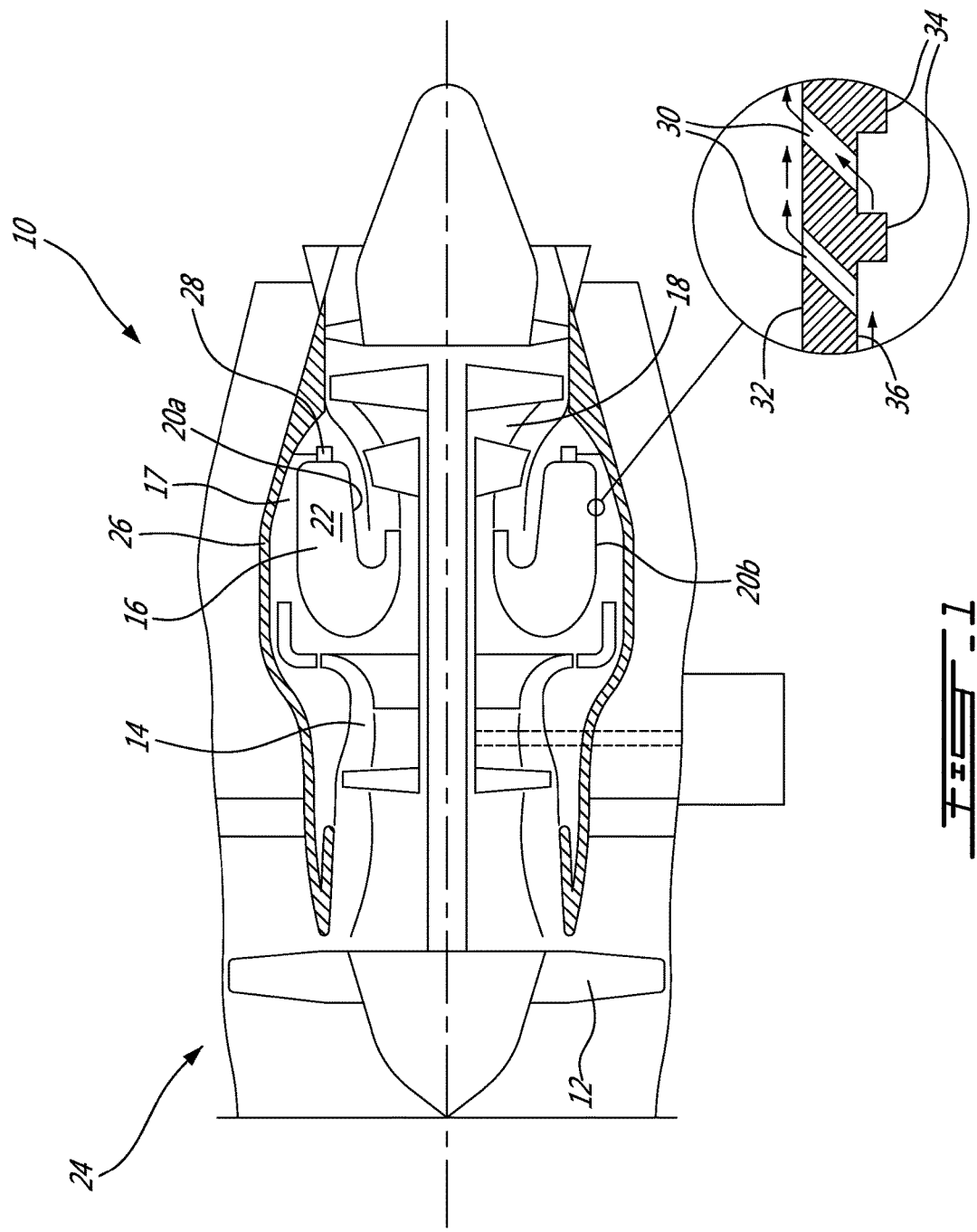
FIG. 1 is a schematic cross-section of a gas turbine engine.

FIG. 1 illustrates a gas turbine engine 10 of a type preferably provided for use in subsonic flight, generally comprising in serial flow communication a fan 12 through which ambient air is propelled, a compressor 14 for pressurizing the air, a combustor 16 in which the compressed air is mixed with fuel and ignited for generating an annular stream of hot combustion gases, and a turbine section 18 for extracting energy from the combustion gases.

The combustor 16 is a single skin combustor. That is the combustor 16 has a single skin liner. According to one embodiment, the single skin liner comprises a radially inner liner 20a and a radially outer liner 20b concentrically disposed relative to a central axis of the engine and defining therebetween an annular combustion chamber 22. The radially inner and radially outer liners 20a, 20b may each be made from a single sheet of metal with through holes defined therein for cooling purposes. In contrast, double or multi-sheet liners have gaps of cooling air made by sandwiching two or more sheets of metal or mounting heat shields on the inner surface of a liner to maintain some form of air gap through which cooling air may be guided to cool the innermost skin of the liner.

A plurality of circumferentially spaced-apart nozzles (only two being shown at 28) are provided at the dome end of the combustor 16 to inject a fuel/air mixture into the combustion chamber 22. Igniters (not shown) are provided along the upstream end portion of the combustion chamber 22 downstream of the tip of the nozzles 28 in order to initiate combustion of the fuel/air mixture delivered into the combustion chamber 22. The inner and outer liners 20a, 20b define a primary zone Z1 (FIG. 5) of the combustion chamber 22 at the upstream end thereof, where the fuel/air mixture provided by the fuel nozzles is ignited. The primary zone Z1 is generally understood as the region in which the fuel is burn and has the highest flame temperature within the combustor 16. The combustor 16 also has a secondary zone, Z2 (FIG. 5) which is the region characterized by first additional air jets to quench the hot product generated by the primary zone Z1; and a dilution zone Z3 (FIG. 5) corresponding to the region where second additional jets quench the hot product and profile the hot product prior to discharge to the turbine section 18.

Figure 2:
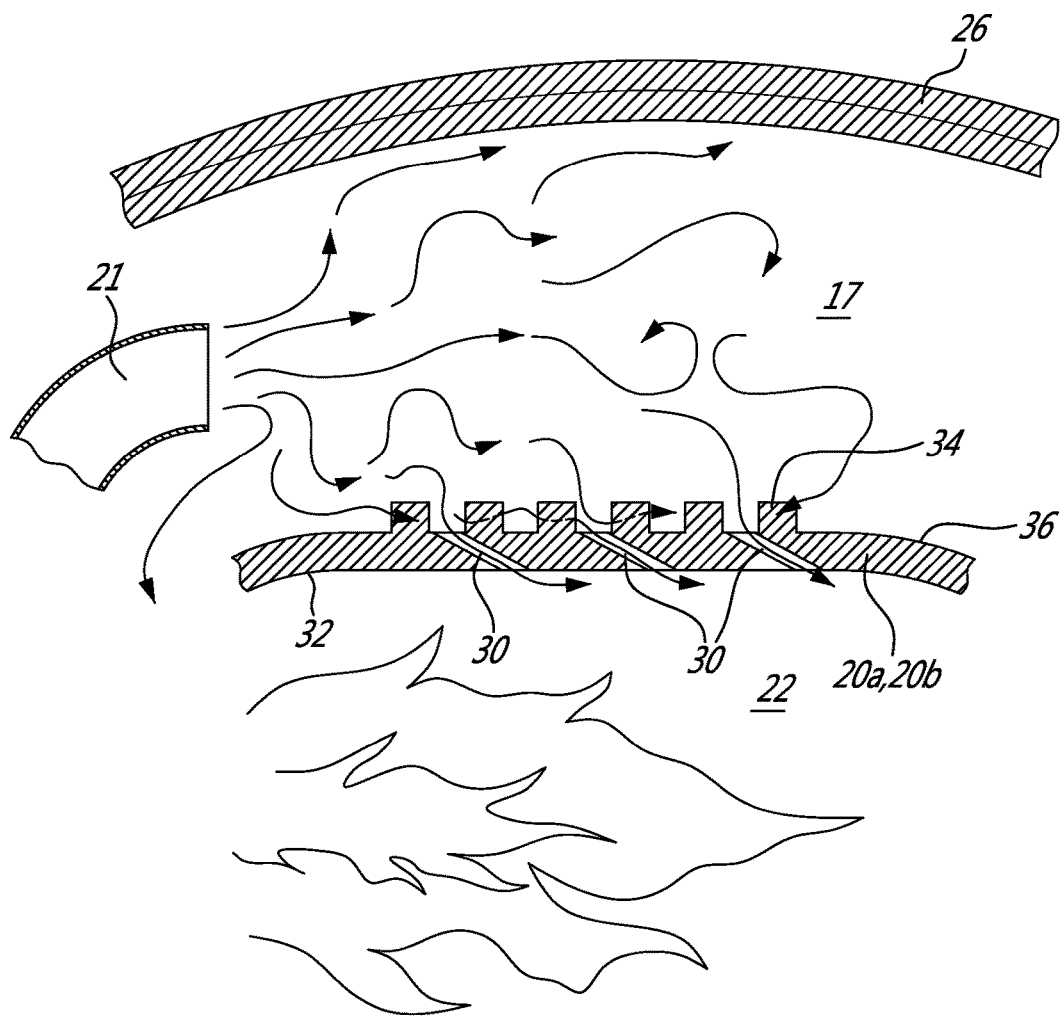
FIG. 2 is a schematic enlarged cross-section view of the combustor of the engine shown in FIG. 1 and illustrating a single skin liner with cooling fins on the cold outer side of the liner.

The combustor 16 is mounted in a plenum 17 circumscribed by an engine casing 26 (e.g. a gas generator case). The plenum 17 extends from the single skin liner of the combustor 16 to the engine casing 26. In other words, the single skin liner is an outermost surface of the combustor 16. The single skin liner is free of coverage in the plenum 17 (it is not surrounded/covered by any flow guiding structure or sleeve to form an air gap like in a double skin design). The plenum 17 is supplied with compressor bleed air from the compressor 14. As illustrated in FIG. 2, the compressor bleed air is discharged from a compressor exit tube 21 into the plenum 17. FIG. 2 schematically illustrates the flow field in the plenum 17. It can be appreciated that the air is allowed to flow according to various flow patterns and in different directions within the plenum 17. The flow is not guided or constricted to flow in an organized manner within the plenum 17. This is different from a cooling flow passing through a gap between two adjacent walls of a multi-skinned designed combustor. According to such double or multi-skinned arrangements, the air flowing over the innermost liner is constrained to flow in predetermined directions.

As schematically illustrated in FIGS. 1 and 2, a plurality of cooling holes 30 are defined in the inner and outer single skin liners 20a, 20b for allowing air in the plenum 17 to flow through the liners 20a, 20b, thereby picking up heat therefrom, and to then form a protective film of cooling air over the combustion facing surface 32 of the liners 20a, 20b.

Still referring to FIGS. 1 and 2, heat transfer augmentation protrusions, such as cooling fins 34, are provided on the cold outer surface or back side 36 of the inner and outer liners 20a, 20b to provide additional cooling by increasing the surface area available for convection cooling. The fins 34 enable the air in the plenum 17 to pick up more heat prior to entering the combustion chamber 22 through the cooling holes 30. Accordingly, cooling efficiency can be improved without increasing cooling air consumption. The fins 34 provide for an additional use of the same cooling air.

The fins 34 may be provided in the form of free-standing pin fins integrally projecting from the outer surface 36 of the radially inner and outer single skin liners 20a, 20b into the plenum 17. The fins 34 may be integrally formed on the outer surface 36 of the liner by means of additive manufacturing or other suitable manufacturing processes. According to one embodiment, cold side fins 34 can be obtained as an extension of a base metal of the single skin liner by laying down successive layers of the base metal onto the outer surface of a perforated sheet metal substrate.

Figure 3:
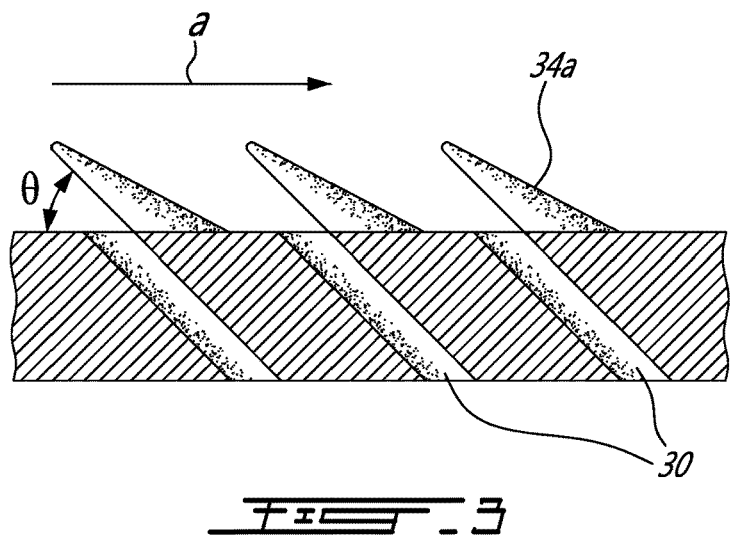
FIG. 3 is a schematic enlarged cross-section view of non-cylindrically shaped fins on the cold outer side of a single skin combustor liner.
Figures 4A, 4B:
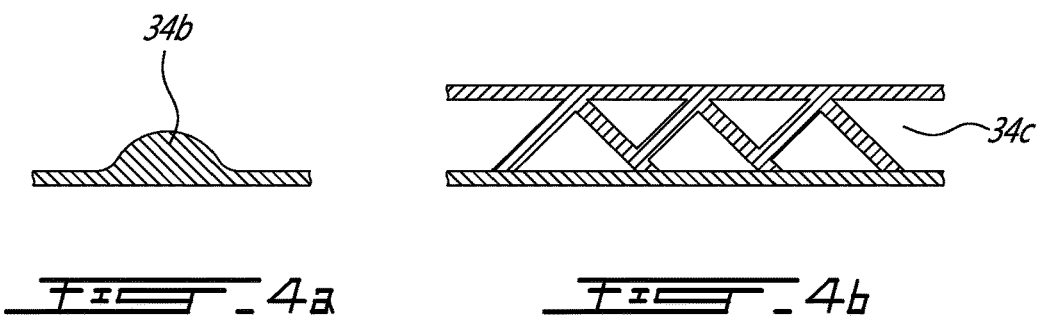
FIGS. 4a and 4b are schematic views illustrating various shapes and configurations that the cooling fins can adopt.

As can be appreciated from FIGS. 2, 3, 4a and 4b, the cooling protrusions may adopt various shapes and configurations. For instance, as shown in FIG. 2, the cooling protrusions could take the form of cylindrical pin fins 34. Alternatively, the protrusions 34a could have a tapering profile as for instance shown in FIG. 3. The cooling protrusions could also take the form of dimples 34b (FIG. 4a) or trusses 34c (FIG. 4b). The protrusions could also have a rectangular geometry and be angularly disposed on the outer surface of the liner with respect to the incoming flow of cooling air. Other shapes and configurations are contemplated as well.

The fins 34, 34a, 34b, 34c are positioned strategically with respect to the cooling hole pattern. For instance, as shown in FIG. 3 in connection with the tapered fins 34a, at least some of the fins 34a could be individually positioned directly behind (immediately downstream) corresponding cooling holes 30 to capture air, thereby creating an extra pressure right in front of the cooling holes 30 to more effectively drive the air through the cooling holes 30 into the combustion chamber 22. As shown in FIG. 3, the fins 34a could be inclined in the upstream direction relative to the air flow (depicted by flow arrow "a") in the plenum by an angle ($\theta$) generally corresponding to the inclination angle of the associated neighboring cooling hole 30. In the illustrated embodiment, the fins 34a extend from the rim of the associated hole 30 on a downstream side thereof relative to the cooling air flow direction. From FIG. 3, it can be appreciated that the front or upstream face of the fin 34a extends generally in continuity to the downstream or back wall surface of the hole 30. However, it is understood that the fins 34, 34a, 34b and 34c could be otherwise interspersed between the cooling holes 30.

Figure 5:
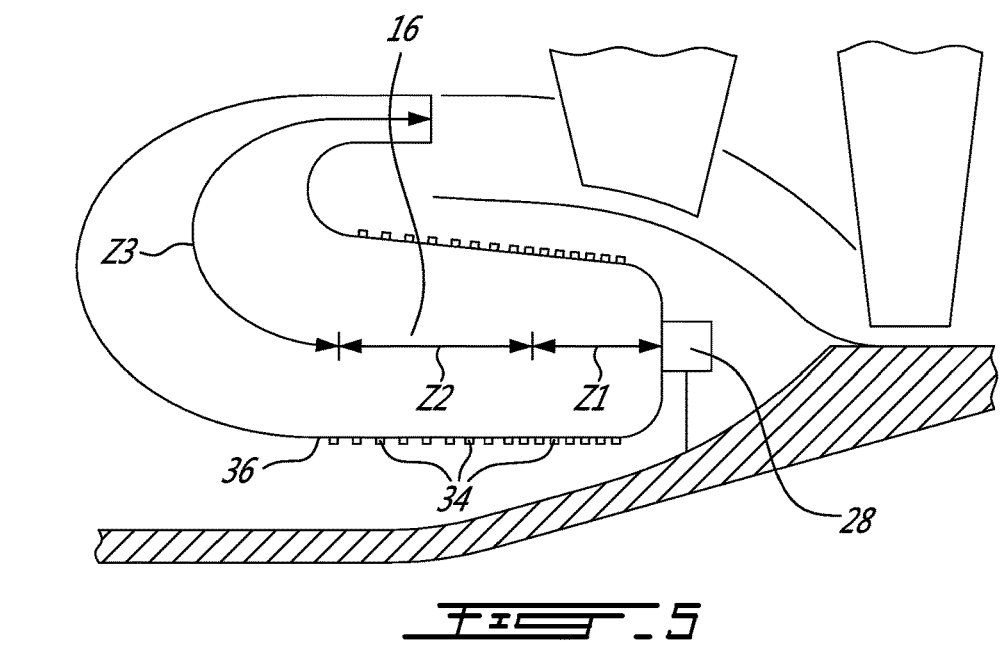
FIG. 5 is a schematic view of the combustor having a higher density of cooling protrusions in the primary zone than in the secondary zone.

The fins 34, 34a, 34b and 34c could be distributed on a partial surface of the single skin liner or over a full surface thereof. The fins 34, 34a, 34b and 34c are distributed so as to provide for a uniform temperature distribution all around the combustor liner 20a, 20b. For instance, the density of fins can be greater in hot spot regions and less in cooler regions of the combustor 16. Also, a greater concentration of fins 34, 34a, 34b and 34c can be provided in certain regions of the combustor 16 where it is desirable to limit the quantity of cooling air flowing into the combustor because the cooling air may have a detrimental effect on the overall combustion process. For instance, in some applications, it might be desirable to cut down on the amount of cooling air directed into the primary zone of the combustor 16 in order to maintain a rich fuel/air mixture ratio. As shown in FIG. 5, this may be achieved by reducing the density of cooling holes 30 in the primary zone and correspondingly increasing the density of cooling fins 34, 34a, 34b and 34c in this same primary zone so as to compensate for the reduced number of cooling holes.

The fins 34, 34a, 34b, 34c can be of uniform or non-uniform height. Also, it is understood that a combination of different shapes of fins can be provided on the cold outer surface 36 of a same single skin liner 20a, 20b. In fact, various combinations of fin sizes, distributions and dimensions are possible.

The cold side fins 34, 34a, 34b, 34c enable the cooling air to be used more than once prior to entering the combustion chamber 22 on a single skin design. Indeed, the compressor bleed air directed into the plenum 17 first flow over the outer surface 36 of the inner and outer liners 20a, 20b through the field of pin fins 34, 34a, 34b, 34c. As the air flows through the fins 34, 34a, 34b, 34c, it picks up heats from the liners 20a, 20b. The air has a second opportunity to cool the liners 20a, 20b by flowing through the cooling holes 30. Indeed, as the air flows through the cooling holes 30, it cools the liners 20a, 20b by in-hole heat transfer. At its exits from the cooling holes 30, the air flows over the inner or hot combustion facing surface 32 of the liners 20a, 20b, thereby providing for the formation of a protective cooling film thereover. Accordingly, with the addition of the fins on the cold side of the liner, the air has (3) opportunities to cool down the liner. Multiple usage of the same cooling air provides for improved cooling efficiency. In this way, single skin combustors may be used in high temperature applications where double skin combustor designs would have typically been retained. Also, since the fins are located on the cold side of the combustor liner, they are not exposed to the hot combustion gasses and are, thus, less subject to erosion over time. This provides for a more robust design. Also the cold side fins 34, 34a, 34b, 34c can be applied in conjunction with existing cooling schemes on single skin liners.

The above description is meant to be exemplary only, and one skilled in the art will recognize that changes may be made to the embodiments described without departing from the scope of the invention disclosed. For instance, the same principle could be applied to a combustor can. Any modifications which fall within the scope of the present invention will be apparent to those skilled in the art, in light of a review of this disclosure, and such modifications are intended to fall within the appended claims.

The invention claimed is:

1. A single skin combustor for a gas turbine engine having an engine casing, the single skin combustor comprising: a single skin liner defining a combustion chamber having a primary zone, a secondary zone and a dilution zone, the single skin liner having an inner surface exposed to the combustion chamber and an outer surface exposed to air in a plenum circumscribed by the engine casing, the outer surface of the single skin liner being an outermost surface of the single skin combustor, cooling holes extending through the single skin liner, and cooling protrusions projecting integrally from the outer surface of the single skin liner, wherein at least some of the cooling protrusions have a non-concave upstream face relative to a flow direction of the air in the plenum, and wherein at least some of the cooling protrusions are interspersed between the cooling holes in the primary zone of the combustion chamber, the cooling holes having inlet openings on the outer surface of the single skin liner, the inlet openings being offset from the cooling protrusions, wherein a higher density of cooling protrusions is provided in the primary zone of the combustor than in the secondary zone thereof.

2. The single skin combustor defined in claim 1, wherein the cooling protrusions are an extension of a base metal of the single skin liner.

3. The single skin combustor defined in claim 1, wherein each cooling protrusion comprises successive layers of sequentially deposit material on a sheet metal base.

4. The single skin combustor defined in claim 1, wherein the cooling protrusions comprise individually free standing fins.

5. The single skin combustor defined in claim 1, wherein the cooling protrusions are of non-uniform height.

6. The single skin combustor defined in claim 1, wherein at least some of the cooling protrusions are disposed immediately downstream of corresponding neighboring cooling holes.

7. The single skin combustor defined in claim 1, wherein at least some of the cooling protrusions and the cooling holes have similar inclination angles.

8. The single skin combustor defined in claim 1, wherein the cooling protrusions are selected from a group consisting of: fins, pin fins, dimples and truss-shaped fins.

9. A method of cooling a single skin liner of a combustor of a gas turbine engine having an engine casing defining a plenum around the single skin liner, the combustor having a primary zone, a secondary zone and a dilution zone, the method comprising: 1) providing a first usage of cooling air in the plenum by causing the cooling air to flow through cooling protuberances extending from an outer surface of a combustion chamber circumscribed by the single skin liner, the cooling protuberances projecting into the plenum around the combustion chamber, wherein a higher density of cooling protuberances is provided in the primary zone of the combustor than in the secondary zone thereof, 2) providing a second usage of the cooling air by flowing the cooling air through cooling holes defined in the single skin liner, and 3) providing a third usage of the cooling air by using the cooling air exiting the cooling holes to form a film of cooling air over an inner surface of the single skin liner.

10. The method defined in claim 9, wherein the cooling air is compressor bleed air, and wherein the method comprises: discharging the compressor bleed air in the plenum, the compressor bleed air being free to flow in various directions within the plenum.

11. The method of claim 9, comprising locally building up pressure in front of the cooling holes.

12. The method of claim 11, wherein locally building up pressure comprises positioning the cooling protuberances directly behind the cooling holes.

13. A gas turbine engine comprising a gas generator case, a combustor disposed within the gas generator case, the combustor comprising a single skin liner circumscribing a combustion chamber, the combustion chamber having a primary zone, a secondary zone and a dilution zone, the single skin liner and the gas generator case defining therebetween a plenum, the single skin liner having an outer surface exposed to cooling air in the plenum and an inner surface exposed to combustion gases in the combustion chamber, cooling holes defined in the single skin liner, the cooling holes fluidly linking the plenum to the combustion chamber, and cooling protuberances integrally projecting from the outer surface of the single skin liner into the plenum, wherein a higher density of cooling protuberances is provided in the primary zone of the combustor than in the secondary zone thereof, the cooling holes having inlet openings on the outer surface of the single skin liner, the inlet openings being offset from the cooling protuberances.

14. The gas turbine engine defined in claim 13, wherein the cooling protuberances comprise individually free standing fins projecting from a perforated sheet metal substrate.

15. The gas turbine engine defined in claim 14, wherein the individually free standing fins are interspersed between the cooling holes, and wherein a density of fins varies over the outer surface of the single skin liner.

\* \* \* \* \*